US007979711B2

(12) United States Patent
Chen et al.

(10) Patent No.: US 7,979,711 B2
(45) Date of Patent: Jul. 12, 2011

(54) SYSTEM AND METHOD FOR PRIVACY PRESERVING QUERY VERIFICATION

(75) Inventors: Hong Chen, West Lafayette, IN (US); Windsor Wee Sun Hsu, San Jose, CA (US); Xiaonan Ma, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 11/835,646

(22) Filed: Aug. 8, 2007

(65) Prior Publication Data

US 2009/0041253 A1    Feb. 12, 2009

(51) Int. Cl.
*H04L 9/32* (2006.01)
(52) U.S. Cl. ....................................................... 713/176
(58) Field of Classification Search .................. None
See application file for complete search history.

(56) References Cited

U.S. PATENT DOCUMENTS

| | | | |
|---|---|---|---|
| 5,987,450 A | 11/1999 | Levy | |
| 6,175,829 B1 | 1/2001 | Li et al. | |
| 6,226,745 B1 | 5/2001 | Wiederhold | |
| 6,970,879 B1 | 11/2005 | Gilmour | |
| 2003/0131229 A1* | 7/2003 | Gladney | 713/155 |
| 2004/0088295 A1 | 5/2004 | Glazer et al. | |
| 2004/0230571 A1 | 11/2004 | Robertson | |
| 2006/0161527 A1 | 7/2006 | Dwork et al. | |
| 2007/0067403 A1 | 3/2007 | Holmes | |
| 2007/0282843 A1* | 12/2007 | Beck | 707/9 |

FOREIGN PATENT DOCUMENTS

| | | |
|---|---|---|
| EP | 0836312 | 4/1998 |
| JP | 2006040277 A | 2/2006 |

OTHER PUBLICATIONS

PCT Search Report PCT/CA2008001436 mailed May 11, 2009.
M. Narasimha et al; "Authentication of Outsourced Databases Using Signature Aggregation and Chaining;" DASFAA 2006, LNCS 3882, pp. 420-436, 2006.
E. Mykletun et al; "Authentication and Integrity in Outsourced Databases;" ACM Transactions on Storage, vol. 2, No. 2, May 2006, pp. 107-138.
H. H. Pang et al.; "Verifying Completeness of Relational Query Results in Data Publishing," Proceedings of the 2005 ACM SIGMOND International Conference on Management of Data; Jun. 14-16, 2005; pp. 407-418.

(Continued)

*Primary Examiner* — Brandon S Hoffman
(74) *Attorney, Agent, or Firm* — Cantor Colburn LLP; Mohammed Kashef

(57) ABSTRACT

The present invention relates to a method for proving the correctness of a query result produced by a data publisher while preserving the privacy of the query result. The method comprises delivering a public key of a public key/private key pair from a data owner to a client and delivering data and cryptographic metadata to at least one data publisher, wherein the metadata is associated both with the data and the public key of the public key/private key pair. The method further comprises receiving a query from the client, returning a query result and a verification object from the data publisher to the client in response to the query, and verifying the correctness of the query result, wherein the correctness of the query result is verified utilizing the verification object and the public key.

20 Claims, 7 Drawing Sheets

OTHER PUBLICATIONS

F. Li et al.; "Dynamic Authenticated Index Structures for Outsourced Databases;" Proceedings of the 2006 ACM SIGMOND International Conference on Management of Data; Jun. 27-29, 2006; pp. 121-132.

H. Chen et al.; "Access Control Friendly Query Verification for Outsourced Data Publishing;" Proc. 13th European Symposium on Research in Computer Security, Oct. 6-8, 2008, Malaga, Spain; pp. 177-191.

P. Devanbu et al.; "Authentic Data Publication Over the Internet;" Journal of Computer Security, vol. 11, Issue 3, pp. 291-314.

G. Miklau et al.; "Managing Integrity for Data Exchanged on the Web;" 8th International Workshop on the Web and Databases (WebDB 2005), Jun. 16-17, 2005 Baltimore, Maryland; pp. 13-18.

M. Narasimha et al.; "DSAC: Integrity for Outsourced Databases with Signature Aggregation and Chaining;" CIKM 2005, Oct. 31-Nov. 5, 2005, Bremen, Germany; pp. 235-236.

P. Devabu et al.; "Authentic Third-Party Data Publication," 14th IFIP 11.3 Conference on Database Security, Aug. 21-23, 2000; pp. 101-112.

System and Method for Privacy Preserving Query Verification, Chen et al., Aug. 11, 2006, Computer Science Storage Systems Department, IBM Almaden Research Center.

Miklau et al., Controlling Access to Published Data Using Cryptography, Proceedings of the 29th International VLDB Conference, 2003, pp. 898-909, Berlin, Germany.

* cited by examiner

```
function CRT_INSERT(r, node, t)
    node.cnt ← node.cnt + 1 if t < k then
        if node.sec = nil then
            create node.sec with [0, N)
        end if
        CRT_Insert(r, node.sec, t + 1)
    end if if node.r - node.l > 1 then
        mid = (node.l + node.r)/2
        if $A_t(r)$ < mid then
            if node.c1 = nil then
                create node.c1 with [node.l, mid)
            end if
            CRT_Insert(r, node.c1, t)
        else
            if node.c2 = nil then
                create node.c1 with [mid, node.r)
            end if
            CRT_Insert(r, node.c2, t)
        end if
    end if
end function
```

CRT Record Insertion Algorithm

FIG. 4 function CRT_DELETE($r$, node, $t$)
  node.cnt ← node.cnt - 1 if $t < k$ then
    CRT_Delete($r$,node.sec, $t$ + 1)
    if node.sec.cnt = 0 then
      remove node.sec
    end if
  end if if node.r - node.l > 1 then
    mid = (node.l + node.r)/2
    if $A_t(r) <$ mid then
      CRT_Delete($r$,node.c1, $t$)
      if node.c1.cnt = 0 then
        remove node.c1
      end if
    else
      CRT_Deletet($r$,node.c2, $t$)
      if node.c2.cnt = 0 then
        remove node.c1
      end if
    end if
  end if
end function

CRT Deletion Algorithm

FIG. 5

```
function CRT_COUNT_CUBE(node,t,c)
    if node.r ≤ L_t ∨ node.l ≥ R_t then
        return ϕ
    end if if node.l ≥ L_k ∧ node.r ≤ R_k then
        if t = k then
            return {node}
        else
            return CRT_Count_Cube(node.sec, t+1, c)
        end if
    else
        ret ← ϕ
        if node.c1. ≠ nil then
            ret ← ret ∪ CRT_Count_Cube(node.c2, t, c)
        end if
        if node.c2 ≠ nil then
            ret ← ret ∪ CRT_Count_Cube(node.c2, t, c)
        end if
        return ret
    end if
end function
```

Cube Record Evidence Algorithm

FIG.6

```
function CRT_Count_Shell(node,t,c,c')
    if node.r ≤ L_t ∨ node.l ≥ R_t then
        return ϕ
    end if x ← c
    x.R_t ← c'.L_t
    ret ← CRT_Count_Cube(node, t, x)

x.L_t ← c'.R_t
    x.R_t ← c.R_t
    ret ← ret ∪ CRT_Count_Cube(node, t, x)

if t < k then
        call CRT_Count_Cube to divide [c'.L_t , c.R_t ) into small intervals,
each represented by a tth order node
        for each node node' do
            ret ← ret ∪ CRT_Count_Shell(node'.sec, t + 1, c, c')
        end for
    end if
        return ret
end function
```

Shell Evidence Algorithm

FIG.7

SYSTEM AND METHOD FOR PRIVACY PRESERVING QUERY VERIFICATION

BACKGROUND OF THE INVENTION

1. Field of the Invention

This invention relates to the field of data publishing, and particularly to solutions for the preservation of privacy in query verification of outsourced third-party data publishing models.

2. Description of Background

Due to the large amounts of data that is available for publication over the Internet or large scale Intranets and the high frequency of query requests for such data, many data owners may find themselves seeking the services of third-party data publishers. In order to provide better service to their clients, data owners typically provide data for publication to one or more third-party data publishers. Problems with the use of third-party data publishers can arise in the event that the publisher or publishers are not trusted. For example, in some instances a publisher may be malicious, meaning that the publisher has the capability to modify the data and as a result return bogus query results to an unsuspecting client.

In a further example, the data publisher's server could be compromised—resulting in the data publisher losing control of the security of their own server. Typically, the securing of large online data systems has proving to be a daunting task. Therefore, it is most critical for a client to ensure that the query result that is received from a publisher that is not trusted is both authentic and complete. The ability to prove the authenticity and completeness of query results can also be very useful in defeating server spoofing attacks, where attackers try to impersonate legitimate servers with their own data servers and feed the clients with malicious information.

Currently solutions that are implemented to guarantee the authenticity and completeness of the query results may result in unforeseen problems. For example, in some instances in order to guarantee the completeness of a dataset a publisher may inadvertently leak information in regard to data records that are outside of a prescribed query space. This result may conflict with implemented access control policies and a client may obtain information that he or she is not allowed to access—thus the privacy of the data is not preserved within the transaction.

SUMMARY OF THE INVENTION

The shortcomings of the prior art are overcome and additional advantages are provided through the provision of a method for proving the correctness of a query result produced by a data publisher while preserving the privacy of the query result. The method comprises delivering a public key of a public key/private key pair from a data owner to a client and delivering data and cryptographic metadata to at least one data publisher, wherein the cryptographic metadata is associated both with the data and the public key of the public key/private key pair. The method further comprises receiving a query from the client, returning a query result and a verification object from the data publisher to the client in response to the query, and verifying the correctness of the query result, wherein the correctness oil the query result is verified utilizing the verification object and the public key.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which results in the increased security and the preservation of privacy of a query verification from a third-party data publishing source.

BRIEF DESCRIPTION OF THE DRAWINGS

The subject matter which is regarded as tie invention is particularly pointed out and distinctly claimed in the claims at the conclusion of the specification. The foregoing and other objects features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Exemplary embodiments of the present invention provide a solution for proving the correctness of query results that have been produced by data publishers that are not trusted, while preserving the privacy of the published data. Thus ensuring that the procedure that is used to verify the correctness of any query results does not require the disclosure of any information that is outside an access control area that is assigned to a query requester. Further, the exemplary embodiments of the present invention are configured to efficiently process multi-dimensional query results while continuing to preserve the privacy of the published data.

Figure 1:
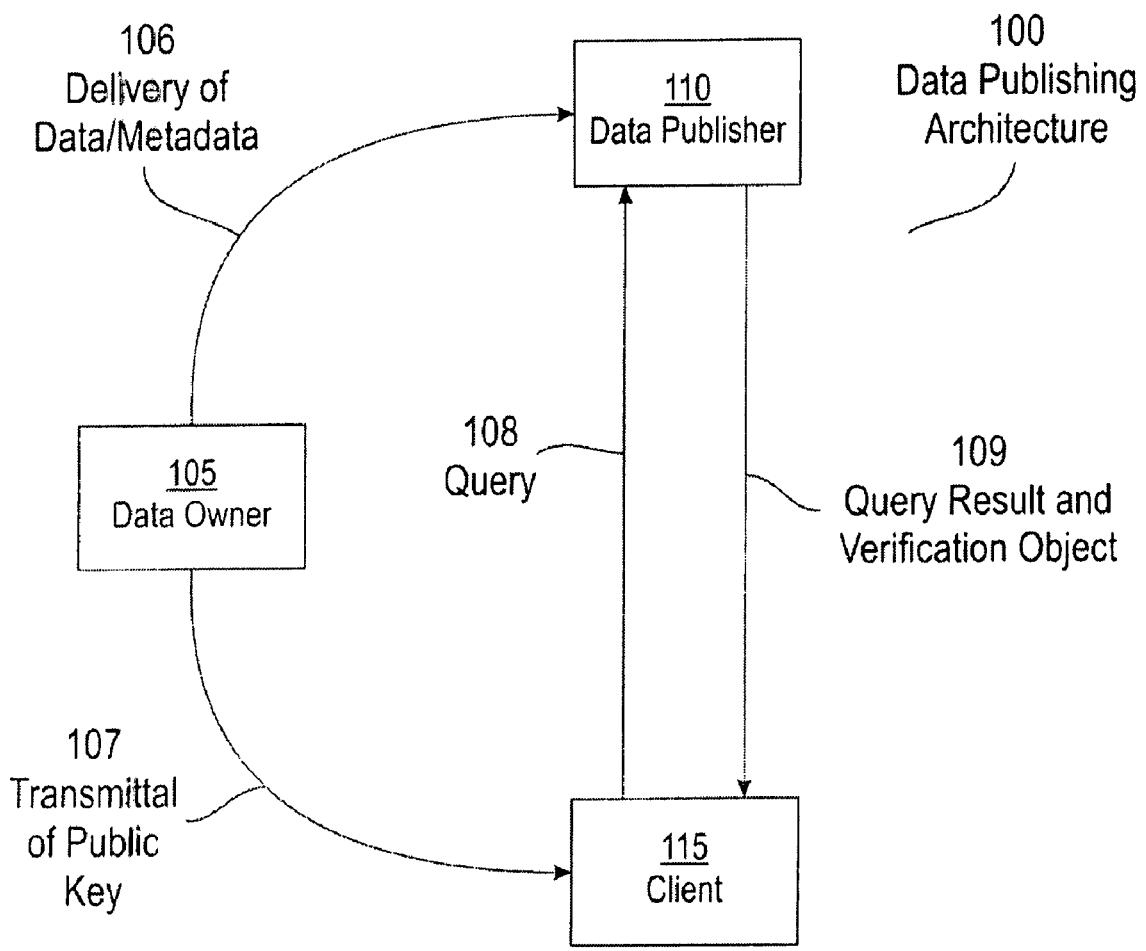
FIG. 1 illustrates one example of a data publishing architecture for outsourced data publishing.

Turning now to the drawings in greater detail, it will be seen that in FIG. 1 a data publishing architecture 100 for the publishing of outsourced data is shown. As shown the system of FIG. 1 comprises three parties—a data owner 105, a data publisher 110 and a client 115. The architecture as shown is exemplary in nature, in actual data publishing environments there can be more than one data owner 105 in addition to multiple data publishers 110. In general, data is generated or collected by the data owner 105. The data owner 105 delivers the data and any data updates to the data publisher 110. Thereafter, the client 115 queries the data publisher 110 to retrieve data instead of directly querying the data owner 105.

The data owner 105 has possession of a pair of public/private keys. Using the private key of the public/private key pair, the data owner 105 performs computational cryptographic techniques over a prescribed dataset wherein cryptographic metadata related to the dataset is produced as a result. The data and metadata 106 are delivered to the data publisher 110. In the event that the client 115 queries 108 the data publisher 110, the data publisher 110 returns the query result and a proof called a Verification Object (VO) 109 to the client 115. The VO being constructed based on the generated metadata. The correctness of the query result is verified using the corresponding VO along with the data owner's 105 public key that has been previously transmitted 107 to the client 115.

Within the exemplary embodiments of the present invention an assumption is made that all data owners 105 are trusted and secure entities. Further, it is assumed that each data owner 105 maintains at least one private-public key pair with which the data owner 105 uses to sign data. It is yet further assumed that all data publishers 110 and clients 115 obtain the correct public keys from each data owner 105 via a trusted communication channel. Since the possibility exists that a data publisher 110 could be compromised, a client 115 is assumed to only trust query results that can be verified using the public key of the corresponding data owner's 105. As such, data publishers 110 enforce access control policies to prevent respective clients 115 from gaining access to information that that the client 115 does not have the right to access. Additionally, since various data publishers 110 may operate independently of each other the data publishers have different access control policies; such policies that may be periodically updated.

Following is a general discussion of exemplary embodiments of the present invention. I-or example, assume that a data owner 105 delivers a table to a data publisher 110 and there are k attributes $A_1, \ldots A_k$ comprised of the table schema. Each k attribute is of integer type and the attribute range is [0, N). Therefore, each record can be represented by a point in the k-space. We let T denote the set of all the points so that:

$$T \subseteq [0, N)^k \qquad \text{Equation 1}$$

Each point in the k-space is equivalent to a record comprised within a dataset. Given any record $r \in T$, we let $A_i(r)$ denote the value of the ith attribute of the record. A client 115 may issue a range query $Q(L_1, R_1, \ldots, L_k, R_k)$, wherein the query Q defines a sub-space q of the k-space:

$$q = [L_1, R_1) \times \ldots \times [L_k, R_k) \subseteq [0, N)^k \qquad \text{Equation 2}$$

The query space of the query Q is thereafter referred to as q. The client 115 issues Q to get the result:

$$T' = \{r | r \in T \wedge r \in q\} \qquad \text{Equation 3}$$

Upon receiving the query Q, the data publisher 110 returns the result T' along with at verification object (VO). The VO is returned along with the result T' in order to guarantee the authenticity and completeness of the query result.

To protect the privacy of the data owner's 105 records, the data publisher 110 enforces a prescribed set of access control policies against the client 115. For example, suppose there is a payroll database wherein each record within the payroll database contains the payroll information belonging to specific individuals. As such, each record contains information in regard to the salary, age and additional miscellaneous information about each person contained within the record. Enacted enforced access policies ensure that a client 115 can only have access to the records wherein the salaries are in the range between $10,000 and $15,000 and the age of the individual is in the range between 20 and 30 years old. These series of ranges are defined as the accessible space of the client 115. The access policy enforced oil a client 115 can be represented as $AC(L_1, R_1, \ldots L_k, R_k)$. The accessible space ac of a client is a sub-space of the k-space, wherein:

$$ac = [L_1, R_1) \times \ldots \times [L_k, R_k) \subseteq [0, N)^k \qquad \text{Equation 4}$$

If the query space of a query Q is q, it is valid only in the event that q is a sub-space of ac, or, $q \subseteq ac$. Within the exemplary embodiments of the present invention any records that exist outside the accessible space of a client 115 are invisible to the client 115. Further, each client 115 is assigned a set of roles, and each role has all accessible space. The accessible space of the client 115 is represented by the union of all accessible spaces of the assigned roles.

In order to prove the correctness of a query results it is imperative that three requirements be satisfied, the authenticity, completeness of a query and preservation of the privacy of a query. Authenticity is defined as meaning that every record in a query result should be from the data owner's 105 database. For example, suppose the result of a query is T' and the database is T. The result of the query is authentic in the event that $T' \subseteq T$. This aspect can be assured by having a data owner 105 sign every record in their database.

Completeness is defined as meaning that every record within a query space should be part of the query result. For example, if we assume that a range query space is q. We will say that the query result is complete in the event that the following equation is satisfied, wherein:

$$\forall r \in T \; r \in q \Rightarrow r \in T' \qquad \text{Equation 5}$$

Privacy preserving or the preservation of privacy is defined as meaning that a client 115 should not have access to or receive any information about the points/records that are outside of the accessible space of the client 115. For example, we assume that the accessible space for a client 115 is ac. All of the points/records that are within the client's accessible space can be represented as $v = T \cap ac$. Further, let $r_0 \in [0,N)^k \backslash ac$ represent some point outside of the client's accessible space. Let Qs be a query sequence and Res(Qs) be the corresponding sequence of query results (which are combined with the corresponding VOs). We say the privacy is preserved if for any $r_0$ and any Qs, we have the following.

$$P(r_0 \in T | (Qs, Res(Qs))) = P(r_0 \in T | v) \qquad \text{Equation 6}$$

Intuitively, this means a client's 115 guess of the record distribution outside their accessible space will not be affected by the query results.

Within the exemplary embodiments of the present invention the following concepts are defined in k-space. A sub-space of the k-space in the following form is defined as a cube, wherein:

$$[L_1, R_1) \times \ldots \times [L_k, R_k) \qquad \text{Equation 7}$$

From the problem definition, a query space is a cube. Additionally, the accessible space of a client 115 is also referred to as a cube. A sub-space of the k-space in the form $c_1 \backslash c_2$ is defined as a shell. Here $c_1$ and $c_2$ are both k-dimensional cubes and $c_2 \subseteq c_1$.

In order to guarantee authenticity, within exemplary embodiments the data owner 105 can sign every record to guarantee authenticity. Since the client 115 acquired the public key of a private-public key pair from the data owner 105, the client 115 can verify the authenticity of the records within the query results. In further exemplary embodiments, the data owner 105 can organize the data utilizing data structures such as merkle hash trees, in which case the data owner only needs to sign the root of the hash tree.

Assume that the accessible space of the client 115 is ac, and the query space of the client 115 is q. Further, assume that there are $n_{ac}$ records in ac, and there are $n_q$ records in q. Thus ac\q is a shell and there are $n_{ac}$-$n_q$ records in the shell. In order to guarantee completeness, the publisher will prove to the client that there are $n_{ac}$ records in ac and there exists at least $n_{ac}$-$n_q$ records in the shell ac-q. Given the above-mentioned proofs in combination with the query result—which is a list of nq records—the client is assured that those nq are the only records in the query space q.

In order to guarantee authenticity and completeness it is possible to have a data owner sign the number of records in the accessible space of every client 115. To prove the existence of a number of records in the shell efficient proof of the existence of the number of records in the shell is needed. A trivial solution would be to give all the records in the shell, the result of such action being resource intensive and expensive, and therefore impractical. As a solution to this problem, within exemplary embodiments of the present invention Canonical Range Trees (CRT) are implemented, and such usage of CRTs will be further discussed below.

With the exemplary embodiments of the present invention the VO comprises three components: the authentication data structure, which proves the authenticity of the data records in the query result; the number of records in the accessible space of the client 115, which is signed by the data owner 105; and the number of records in the shell which is also authenticated by the data owner 105. It must be noted that although the shell is a function of the query, the exemplary embodiments do not require that data publishers 110 to contact the data owner for each query. The authentication data structure as implemented to allow for data publishers 110 to efficiently prove to a client 115 the number of data records that exist within a particular shell. In order to preserve privacy as defined in Equation 6, we need to make sure the VO doesn't leak any information outside ac. Therefore, a VO is constructed such that the VO only depends on the records outside of the query space and inside the accessible space of the client 115.

A range tree is a data structure that is used in computational geometry to store points in k-space. In the present solution a data structure that is a modified version of the range tree is utilized—this structure being referred to as a CRT. We use CRT to store the counting information for data points. And we will use a set of nodes of the tree as proof of existence of records in the shell.

CRTs can be constructed as single (FIG. 2) or multi-dimensional (FIG. 3) computational models. In the instance of a one-dimensional CRT, the CRT is used to store a list of numbers $x_1, \ldots x_n$. A one dimensional CRT is a binary tree, wherein each node of the tree corresponds to an interval. Suppose you have a CRT node that is labeled as node. The CRT node stores the information of interval [node.1, node.r). For each node, there is also a counter to store the number of points in the interval. Further, node.cnt stores the number of points in the interval [node.1, node.r).

The size of the interval of a node node.r−node.1 is always a power of 2. We will call the interval [node.1, (node.r+node.1)/2) the left sub-interval and the interval [(node.r+node.1)/2, (node.r−node.1)/2) the right sub-interval. Assume that there are n' records out of node.cnt fall in the left sub-interval. Then node will have a left child node1 in the event that n'>0:

$$node_1.1 = node.1 \quad node_1.r = (node.r + node.1)/2$$
$$node_1.cnt = n'$$

Similarly suppose n" nodes fall in the right sub-interval, and n">0, then node will have a right child $node_2$:

$$node_2.1 = (node.1 + node.r)/2 \quad node_1.r = node.r$$
$$node_1.cnt = n''$$

Figure 2:
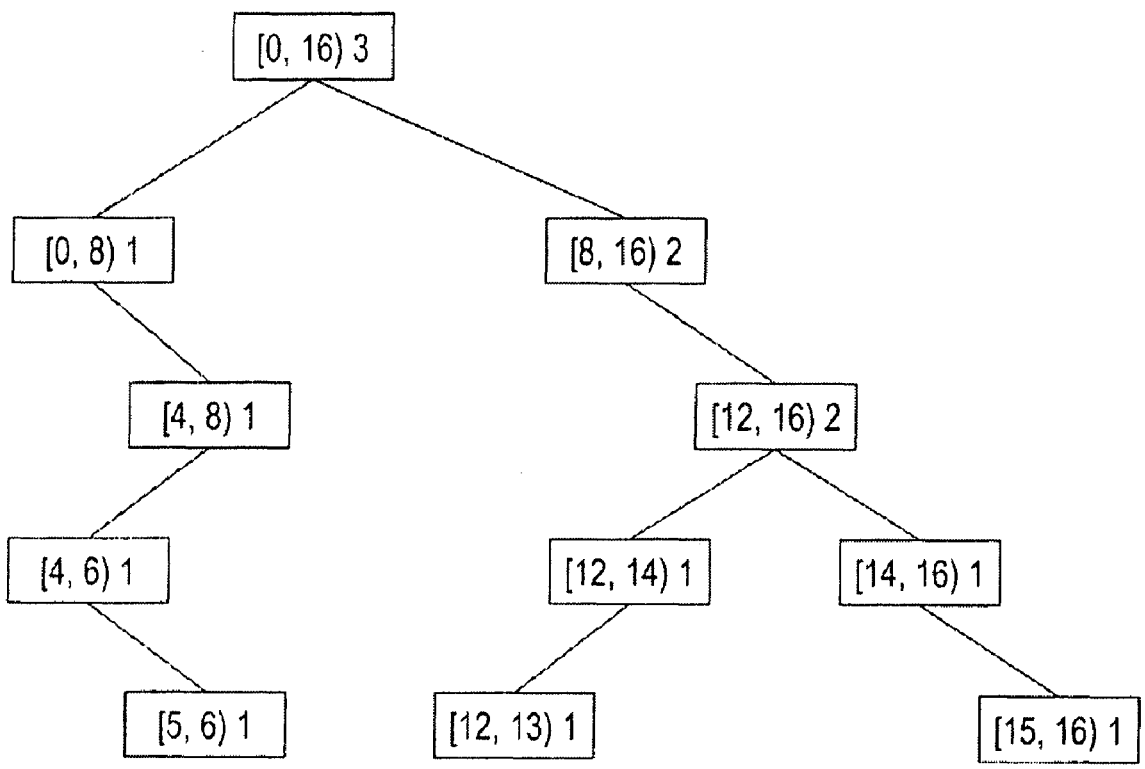
FIG. 2 illustrates one example of a one-dimensional CRT in accordance with exemplary embodiments of the present invention.

We use node.c1 and node.c2 to store the left/right child of node. Each one could be nil, further, if the size of the interval for a node is 1. the node doesn't have ally child node. The root node of the tree corresponds to the interval [0, N). An exemplary one-dimensional CRT for the value set {5, 12, 15} is shown in FIG. 2.

As mentioned above, a CRT can also be constructed in multi-dimension. As an examples in order to construct a CRT in two-dimensional space initially assume we have a list of points $(x_1, y_1), \ldots (x_n, y_n)$. First, a one dimensional CRT is constructed for the list of numbers $x_1, \ldots x_n$. This tree is referred to as the primary structure. Thereafter, for every node of the primary structure we assume that there are n' points of which the first coordinator is in the interval [node.1, node.r), thus node.cnt=n'. Let $(x'_1, y'_1), \ldots (x'_{n'}, y'_{n'})$ be these points. A one dimensional CRT is then built for this node in order to store information for the numbers $y'_1, \ldots y'_{n'}$. In this way a primary structure is built, and for every node of the primary structure a secondary structure is built. For each node of the primary structure, we use another field node.sec to record the root of the secondary CRT structure. FIG. 2 shows an example of two-dimensional CRT. Using this technique higher dimensional CRTs call be constructed.

Figure 3:
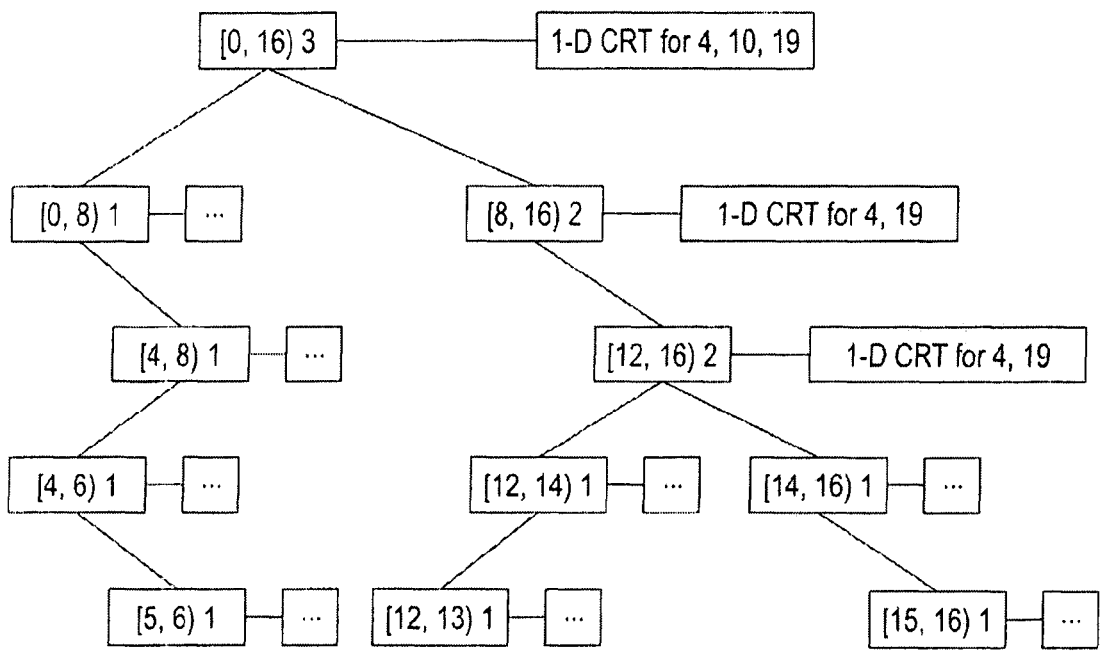
FIG. 3 illustrates one example of a two-dimensional CRT in accordance with exemplary embodiments of the present invention.

For a two dimensional CRT, a node of the primary structure is referred to as a first order node and a node of the secondary structure is referred to as a second order node. A first order node stores the number of points in the area [node.1, node.r)×[0, N). Assume that node' is a node belongs to the secondary structure attached to node, then node' stores the number of points in the area [node.1, node.r)×[node'.1, node'.r). Similarly, a node of a k dimensional CRT stores the number of points in a k-dimensional cube. An exemplary two-dimensional CRT for the value set ((5, 10), (12, 19), (15, 14)} is shown in FIG. 3.

A data owner 105 will maintain a k-dimensional CRT for all the records. For example, if there are n records in the database, the data owner 105 can build an empty CRT and insert all of the data to the CRT. The data owner 10 also signs all the kth order nodes. Additionally, the data owner 105 maintains a counter for each access control space. Assume that there are in access control spaces $ac_1, \ldots ac_m$, the data owner maintains and signs the pairs $(ac_1, cnt_1), \ldots (ac_m, cnt_m)$. The number of records in access control space $ac_i$ is represented by $cnt_i$. Further, for a CRT given any k dimensional rectangular space S we can assume that there are α points from T that are inside S.

A CRT can use a small number of non-overlapping nodes that are completely within S to prove that there are at least α points in S. This property is very useful for constructing the VO. The data owner 105 gives a signed CRT and the signed list of access control counters to tile data publisher 110. When a client 115 submits a query and the query space is q, the access control space of the client 115 is ac. The data publisher 110 returns the query result to the client 115 with the VO comprising the signature of each record in the query result, the signed number of records in the access control space ac, and the evidence of the existence of all the records in the shell ac\q.

In the event that a data owner 105 desires to update T, the data owner 105 can add a new record into the table, or they could delete a record from the current table. The table updating will change counters of some of the nodes within the CRT structure. The data owner 105 will communicate to the data publishers 110 the desire to update T. Thus the data publishers 110 will receive a set of signed nodes, wherein these signed nodes will be used to replace the existing nodes.

Since the data publishers 110 would have different versions of the signed nodes, client 115 should be assured the freshness of the data. In the other words, the client should make sure the publisher does not use the outdated VO to verify the query results. Therefore, instead of signing each individual node, the data owner can have a digest scheme (e.g., a Merkle Tree) to have a root hash of the whole CRT, and make the client aware of the root hash. Also, to keep the client 115 aware of the root hash, the data owner 105 can either sign the root hash periodically, or publish the root hash in their own server.

In the event that a client 115 is assigned with a set of roles, each role will have its own access control space. Thus the accessible space for the client 115 is the union of the access control spaces of all the roles. Suppose the client 115 is assigned with r roles. The solution we discussed in previous sections assumes that the accessible space for a client is a cube. A way to extend the solution to multiple roles client is to use the same solution as if the client submits r queries and activate one role each time. Thus allowing for the client 115 to combine all the query results to get the final answer. A potential limitation in regard to the fore-mentioned approach is that two queries in the series of queries can share the same query result records. This would incur redundant communication and computational operations. Therefore, the client 115 can divide the original query space into a set of smaller (non-overlapping) cube query spaces, which are within different access control spaces. Then the client 115 can submit queries for those smaller cube query spaces, thus ensuring there would be no redundant communication and/or computation.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for proving the correctness of a query result produced by a data publisher while preserving data privacy, the method comprising:
   delivering a public key of a public key/private key pair from a data owner to a client;
   delivering data and cryptographic metadata to at least one data publisher, wherein the metadata is associated both with the data and the public key of the public key/private key pair;
   receiving a query from the client;
   returning a query result and a verification object from the data publisher to the client in response to the query; and
   verifying the correctness of the query result, wherein the correctness of the query result is verified utilizing the verification object and the public key.

2. The method of claim 1, wherein the client is assigned an accessible space in which to perform query searches in accordance with a determined access control policy.

3. The method of claim 2, wherein the verification object is generated in accordance with the determined access control policy that is assigned to the client and the query results that are comprised within the accessible space of the client.

4. The method of claim 3, wherein the data owner provides a digital signature stating that there are nac data points comprised within the accessible space (ac) that is assigned to a client.

5. The method of claim 4, wherein a verification object comprises a data point authentication data structure, a signature from the data owner stating the number of data points nac within an accessible space (ac), and additional verification data stating that ac-q comprises at least nac-nq data points.

6. The method of claim 5, wherein verifying the correctness of a query result comprises verifying the authenticity and completeness of query result data.

7. The method of claim 6, wherein a valid query space (q) is comprised of a subspace of the client's accessible space (ac).

8. The method of claim 7, wherein a client does not have access to information in regard to data points outside of the accessible space (ac) that has been assigned to the client.

9. The method of claim 8, wherein a client does not have access to information in regard to the access control polices of additional clients of the data publisher.

10. The method of claim 9, wherein a dataset, an access control policy, and a query are multi-dimensional.

11. A computer program product that includes a computer readable device useable by a processor, the medium having stored thereon a sequence of instructions which, when executed by the processor, causes the processor to verify the correctness of a query result while preserving data privacy by:
    receiving data and cryptographic metadata that is associated with the data and the public key of a public key/private key pair from a data owner;
    receiving a query from a client;
    returning a query result and a verification object from at least one data publisher to the client in response to the query; and
    verifying the correctness of the query result, wherein the correctness of the query result is verified utilizing the verification object and the public key.

12. The computer program product of claim 11, wherein the client is assigned an accessible space in which to perform query searches in accordance with a determined access control policy.

13. The computer program product of claim 12, wherein the verification object is generated in accordance with the determined access control policy that is assigned to the client and the query results that are comprised within the accessible space of the client.

14. The computer program product of claim 13, wherein a digital signature is received from the data owner stating that there are nac data points comprised within an accessible space (ac) that is assigned to a client.

15. The computer program product of claim 14, wherein a verification object comprises a data point authentication data structure, a signature from the data owner stating the number of data points nac within an accessible space (ac), and additional verification data stating that ac-q comprises at least nac-nq data points.

16. The computer program product of claim 15, wherein verifying the correctness of a query result comprises verifying the authenticity and completeness of query result data.

17. The computer program product of claim 16, wherein a valid query space (q) is comprised of a subspace of the client's accessible space (ac).

18. The computer program product of claim 17, wherein a client is not permitted to have access to information in regard to data points outside of the accessible space (ac) that has been assigned to the client.

19. The computer program product of claim 18, wherein a client is not permitted to have access to information in regard to the access control polices of additional clients of the data publisher.

20. The computer program product of claim 19, wherein a dataset, an access control policy, and a query are multi-dimensional.

* * * * *